(12) United States Patent
Sanayei et al.

(10) Patent No.: US 9,699,048 B2
(45) Date of Patent: Jul. 4, 2017

(54) COMPUTING SYSTEM WITH CHANNEL QUALITY MECHANISM AND METHOD OF OPERATION THEREOF

(71) Applicant: Samsung Electronics Co., Ltd., Suwon-si, Gyeonggi-Do (KR)

(72) Inventors: Shahab Sanayei, San Diego, CA (US); Vignesh Sethuraman, La Jolla, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 186 days.

(21) Appl. No.: 14/529,464

(22) Filed: Oct. 31, 2014

(65) Prior Publication Data

US 2015/0230117 A1 Aug. 13, 2015

Related U.S. Application Data

(60) Provisional application No. 61/939,675, filed on Feb. 13, 2014.

(51) Int. Cl.
*H04W 24/10* (2009.01)
*H04L 12/26* (2006.01)

(52) U.S. Cl.
CPC .......... *H04L 43/08* (2013.01); *H04L 43/0811* (2013.01)

(58) Field of Classification Search
None
See application file for complete search history.

(56) References Cited

U.S. PATENT DOCUMENTS

| 8,077,796 | B2 | 12/2011 | Qi et al. |
| 8,199,713 | B2 | 6/2012 | Sankaran et al. |
| 8,285,319 | B2 | 10/2012 | Shin et al. |
| 8,385,222 | B2 | 2/2013 | Lindoff et al. |
| 8,619,719 | B2 | 12/2013 | Wengerter et al. |
| 8,644,879 | B2 | 2/2014 | Pani et al. |

(Continued)

OTHER PUBLICATIONS

M. Badiu, M. Varga, V. Bota, and A.Vlaicu; "Simplification of a Link Performance Prediction Method Based on Mutual Information"; Acta Technica Napocensis. Electronica-Telecomunicatii;Sep. 2012, vol. 53 Issue 3, p. 8; Sep. 2012.

(Continued)

*Primary Examiner* — Kevin C Harper
*Assistant Examiner* — Derrick V Rose
(74) *Attorney, Agent, or Firm* — IP Investment Law Group

(57) ABSTRACT

A computing system includes: an inter-device interface configured to receive receiver signal for communicating serving content contemporaneously with interference signal; a communication unit, coupled to the inter-device interface, configured to: determine interference communication scheme for representing the interference signal included in the receiver signal, and generate channel feedback information based on the interference communication scheme.

A method of operation of a computing system includes generating an interference-based feedback mechanism with a control unit based on a negative feedback count, a serving metric set, a negative feedback count, or a combination thereof for controlling the channel feedback information.

17 Claims, 4 Drawing Sheets

(56) References Cited

U.S. PATENT DOCUMENTS

| | | | |
|---|---|---|---|
| 2009/0046800 A1* | 2/2009 | Xu | H04B 7/0617 375/267 |
| 2009/0291686 A1 | 11/2009 | Alpert et al. | |
| 2011/0249579 A1* | 10/2011 | Hu | H04L 5/001 370/252 |
| 2012/0182914 A1 | 7/2012 | Hariharan et al. | |
| 2013/0182569 A1 | 7/2013 | Bertrand et al. | |
| 2013/0194950 A1 | 8/2013 | Haghighat et al. | |
| 2013/0195023 A1 | 8/2013 | Vaisanen et al. | |
| 2013/0223402 A1 | 8/2013 | Feng et al. | |
| 2014/0003260 A1 | 1/2014 | Tabet et al. | |
| 2014/0098688 A1 | 4/2014 | Kang et al. | |
| 2014/0128115 A1 | 5/2014 | Siomina et al. | |
| 2015/0078191 A1* | 3/2015 | Jongren | H04L 1/0026 370/252 |
| 2015/0117239 A1* | 4/2015 | Lindoff | H04W 72/08 370/252 |

OTHER PUBLICATIONS

H. Lee, T. Kim, W. Park, and J. Lim; "Link Performance Abstraction for Interference-Aware Communications (IAC)." CoRR abs/1310.0872 (2013); http://arxiv.org/pdf/1310.0872.pdf.

S. Moon, K. Lee, J. Kim, and I. Lee; "An effective link error prediction technique for MIMO-OFDM systems with ML receiver"; 2012 IEEE International Conference on Communications (ICC), Jun. 10-15, 2012; pp. 4262-4266.

J. Lee, H. Kwon and I. Kang, "Interference mitigation in MIMO interference channel via successive single-user soft decoding", Information Theory and Applications Workshop, Feb. 2012; http:ita.ucsd.edu/workshop/12/files/paper/paper_2217.pdf.

* cited by examiner

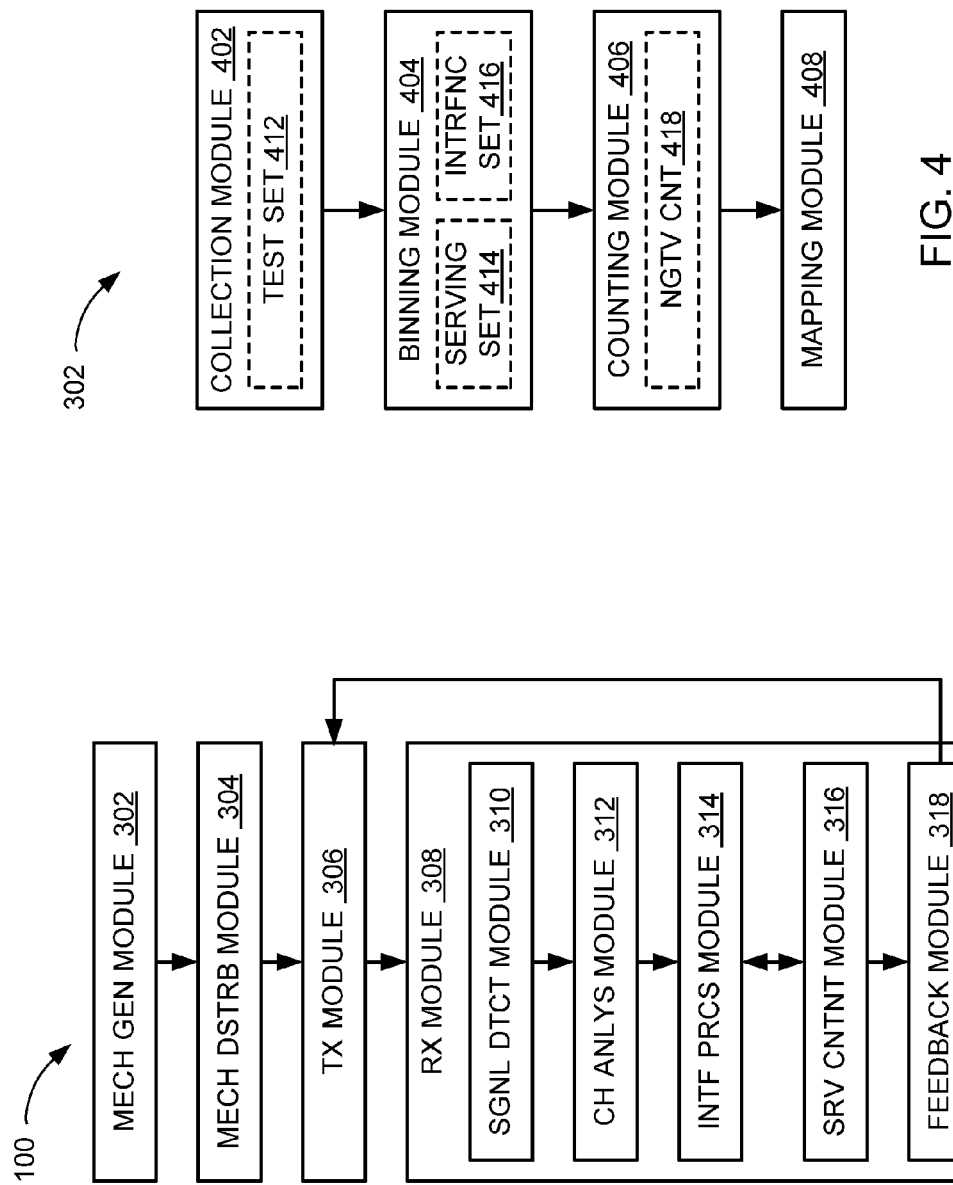

COMPUTING SYSTEM WITH CHANNEL QUALITY MECHANISM AND METHOD OF OPERATION THEREOF

CROSS-REFERENCE TO RELATED APPLICATION(S)

This application claims the benefit of U.S. Provisional Patent Application Ser. No. 61/939,675 filed Feb. 13, 2014, and the subject matter thereof is incorporated herein by reference thereto.

TECHNICAL FIELD

An embodiment described herein relates generally to a computing system, and more particularly to a system with channel quality mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with channel quality mechanism. In view of the ever-increasing commercial competitive pressures, along with growing consumer expectations and the diminishing opportunities for meaningful product differentiation in the marketplace, addressing such issues are becoming increasingly valuable. Additionally, the need to reduce costs, improve efficiencies and performance, and meet competitive pressures adds an even greater urgency for finding answers to these problems.

Solutions to these problems have been long sought but prior developments have not taught or suggested any solutions and, thus, solutions to these problems have long eluded those skilled in the art.

SUMMARY

An embodiment described herein provides a computing system, including: an inter-device interface configured to receive receiver signal for communicating serving content contemporaneously with interference signal; a communication unit, coupled to the inter-device interface, configured to: determine interference communication scheme for representing the interference signal included in the receiver signal, and generate channel feedback information based on the interference communication scheme.

An embodiment described herein provides a method of operation of a computing system including: receiving receiver signal for communicating serving content contemporaneously with interference signal; determining interference communication scheme for representing the interference signal included in the receiver signal; and generating channel feedback information with a communication unit based on the interference communication scheme.

An embodiment described herein provides a method of operation of a computing system including: observing a test signal set; collecting a serving metric set based on the test signal set; collecting an interference metric set based on the test signal set; determining a negative feedback count corresponding to the serving metric set, the interference metric set, or a combination thereof; and generating an interference-based feedback mechanism with a control unit based on the negative feedback count, the serving metric set, the feedback count, or a combination thereof for controlling a channel feedback information.

An embodiment described herein provides a non-transitory computer readable medium including instructions for operating a computing system including: observing a test signal set; collecting a serving metric set based on the test signal set; collecting an interference metric set based on the test signal set; determining a feedback count corresponding to the serving metric set, the interference metric set, or a combination thereof; and generating an interference-based feedback mechanism based on the feedback count, the serving metric set, the feedback count, or a combination thereof for controlling a channel feedback information.

Certain embodiments have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 3 is a control flow of the computing system.

FIG. 4 is a detailed control flow of the mechanism generator module.

DETAILED DESCRIPTION

Figure 1:
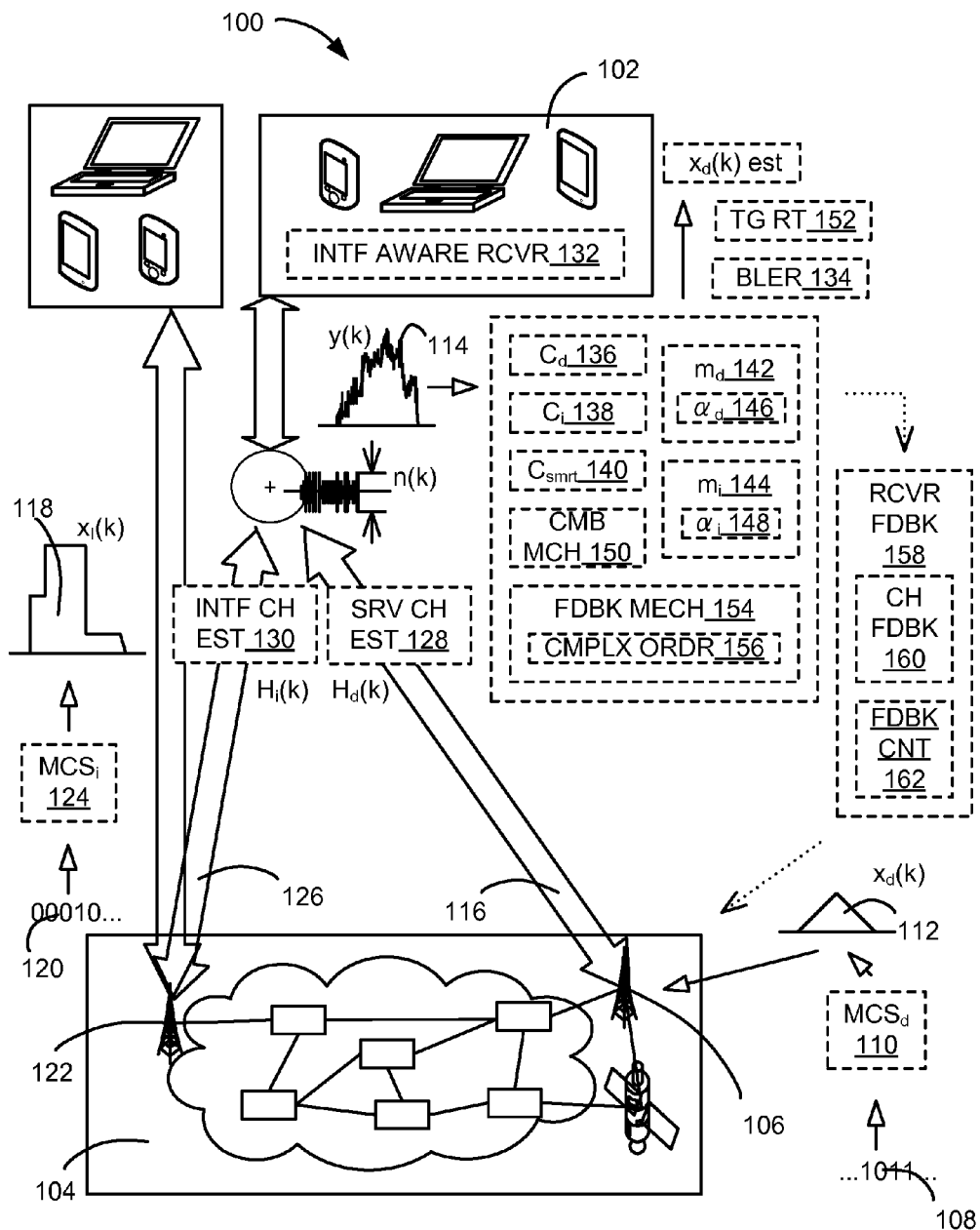
FIG. 1 is a computing system with channel quality mechanism in an embodiment.

The following embodiments can be used to generate an interference-based feedback mechanism for controlling channel feedback information and subsequent serving communication scheme. The interference-based feedback mechanism can be directly based on an interference communication scheme corresponding to interference signal. The interference-based feedback mechanism can further be directly based on various aspects of the channel, such as interference link metric or the serving link metric. The interference-based feedback mechanism can further correspond to the serving communication scheme for a target rate for a block error rate.

The interference-based feedback mechanism can be used to respond to processing receiver signal. Receiving device can utilize an interference-aware receiver to calculate the interference link metric, the serving link metric, or a combination thereof based on processing the receiver signal.

The receiving device can further utilize the interference-aware receiver to determine the interference communication scheme. The receiving device can use the interference link metric, the serving link metric, the interference communication scheme, or a combination thereof as input for the interference-based feedback mechanism to determine the channel feedback information or the serving communication scheme. The determined instance of the channel feedback information or the serving communication scheme can be appropriate for establishing or producing the target rate in communicating serving content within the communication environment.

The following embodiments are described in sufficient detail to enable those skilled in the art to make and use the embodiments described herein. It is to be understood that other embodiments would be evident based on the present disclosure, and that system, process, or mechanical changes may be made without departing from the scope of an embodiment.

In the following description, numerous specific details are given to provide a thorough understanding of an embodiment. However, it will be apparent that an embodiment may be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. The embodiments have been numbered first embodiment, second embodiment, etc. as a matter of descriptive convenience and are not intended to have any other significance or provide limitations for an embodiment.

The term "module" referred to herein can include or be implemented as software, hardware, or a combination thereof in an embodiment described herein in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with channel quality mechanism in an embodiment. The computing system 100 includes a first device 102, such as a mobile device including a cellular phone or a notebook computer, connected to a network 104. The first device 102 can further include a wired device, such as a modem or a router. The first device 102 can further include a circuit or a device within a comprehensive device, such as a portion or circuit specializing in processing information within a storage device or system. The first device 102 can include a user equipment (UE).

The network 104 is a system of wired or wireless communication devices or means that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks. Also for example, the network 104 can include a communication bus, a wire, a cable, a wireless connection, or a combination thereof between units within a device.

The computing system 100 can include a second device 106 for directly or indirectly linking and communicating with the first device 102. The network 104 can include or couple to the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a coordinating device or a controlling device for communication in the computing system 100, a base station, an evolved node B (eNodeB), a server, a router, a modem, or a combination thereof. As a more specific example, the second device 106 can include the coordinating device or the controlling device controlling, managing, or scheduling functions, actions, tasks, or a combination thereof for various devices within the computing system 100.

Also for example, the second device 106 can be a communication device or a processing component included or with a cell tower, a wireless router, an antenna, or a combination thereof being used to communicate with, such as by sending signals to or receiving signals from, the first device 102 including a mobile computing device. Also for example, the second device 106 can include a portion or circuit specializing in storing information within the storage device or system.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The computing system 100 can communicate serving content 108 between devices. The serving content 108 can include information or data intended for communication between devices.

For example, the serving content 108 can be device intended for communication between the first device 102 and the second device 106. As a more specific example, the serving content 108 can include information or data to be executed or implemented at an intended receiving device, communicated through the intended receiving device, or a combination thereof, such as voice signals, images, instructions, program data, execution steps, or a combination thereof.

The computing system 100 can process the serving content 108 for communication according to a serving communication scheme 110. The serving communication scheme 110 can include a representation of or a control parameter for one or more processes associated with communicating the serving content 108. For example, the serving communication scheme 110 can represent or control a coding process, a modulation process, or a combination thereof. Also for example, the serving communication scheme 110 can include modulation coding scheme (MCS), or a value or a parameter associated therewith.

As a more specific example, the serving communication scheme 110 can include an index value for representing or controlling a likely or targeted communication parameter, such as a data rate, for communicating the serving content 108. The serving communication scheme 110 can summarize or include a number of spatial streams, a modulation type, a coding rate, or a combination thereof.

The serving communication scheme 110 can describe or dictate the modulation type, such as phase-shift keying (PSK), amplitude modulation (AM), or a derivation thereof, such as for binary, quadrature, 16, or 64. For example, the serving communication scheme 110 can describe or dictate binary PSK (BPSK), quadrature PSK (QPSK), quadrature AM (QAM), 16-QAM, or 64-QAM.

The serving communication scheme 110 can further describe or dictate the coding rate corresponding to portion of the data stream that is useful or non-redundant. For example, the serving communication scheme 110 can describe or control a portion within code word generated using an error-correcting coding mechanism, such as turbo coding or polar coding, corresponding to the serving content 108.

The serving communication scheme 110 can further describe or dictate the number of spatial streams, such as for single-input single-output (SISO) communication scheme or multiple-input multiple-output (MIMO) communication scheme. The serving communication scheme 110 can describe or dictate a number of non-redundant sets or streams of information corresponding to the serving content 108 simultaneously transmitted and received for communicating the serving content 108.

The computing system 100 can process the serving content 108 and transmit a serving signal 112 for communicating the serving content 108. The serving signal 112 can be represented as '$x_d(k)$'. The serving signal 112 can include the information actually transmitted at the transmitting device for sending the serving content 108.

For example, the serving signal 112 can include a sequence of symbols representing the serving content 108 according to the modulation scheme, one or more code words representing the serving content 108 according to the coding mechanism, or a combination thereof. The serving signal 112 can correspond to the serving content 108 processed or transformed according to the serving communication scheme 110, such as based on the modulation type or scheme, the number of spatial streams, the coding rate, or a combination thereof.

The computing system 100 can include a receiver signal 114 perceived or received at a receiving device. The receiver signal 114 can include information detected or identified at the receiving device. The receiver signal 114 can correspond to the serving signal 112. The receiver signal 114 can be the information corresponding to the serving signal 112 received at the intended device. The receiver signal 114 can be represented as '$y(k)$'.

For illustrative purposes, the computing system 100 is described as the first device 102 being a UE receiving the receiver signal 114 corresponding to the serving signal 112 transmitted by the second device 106 intended for the first device 102. However, it is understood that the first device 102 can also transmit information and the second device 106 can also receive signals. It is also understood that the first device 102 can include a planning device, a base station, or a combination thereof. It is also understood that the second device 106 can include a UE.

The receiver signal 114 can include components or portions corresponding to the serving signal 112 after traversing a serving channel 116. The receiver signal 114 can include the serving signal 112 altered or changed from traversing the serving channel 116.

The serving channel 116 can include environments or connections between device exchanging signals. The serving channel 116 can each include be a direct link between corresponding devices, such as between the UE and the base station. The serving channel 116 can correspond to signals intended for exchange between corresponding devices, such as between the first device 102 and the second device 106.

The serving channel 116 can include repeaters, amplifiers, or a combination thereof there-between for an indirect link. The serving channel 116 can further include a specific instance or parameter of communication detail, such as frequency, time slot, packet designation, transmission rate, channel code, or a combination thereof used for transmitting signals between intended devices.

The serving channel 116 can further include physical characteristics unique to geographic locations associated with the corresponding devices. The serving channel 116 can include structures or influences, such as fading characteristics of signals or causes for unique delay or reflection of signals, affecting the transmission of wireless signals. The serving channel 116 can distort or alter the signals traversing therein.

The receiver signal 114 can further include a noise component. The noise component can include errors, influences, changes, or a combination thereof affecting accuracy of the data. The noise component can include additive Gaussian white noise (AGWN) or variations based on Rayleigh distribution. The noise component can further include inaccuracies, hardware limitations, or a combination thereof from the transmitting device or the second device 106, the receiving device or the first device 102, the serving channel 116, the network 104, or a combination thereof.

The receiver signal 114 further include an interference signal 118 corresponding to interference content 120 transmitted by an interference source 122. The interference signal 118 can include information actually transmitted at the interference source 122 intended for a device other than the receiving device. The interference signal 118 can be similar to the serving signal 112 but transmitted by the interference source 122 instead of the second device 106, intended for a different device other than the first device 102 receiving the receiver signal 114 including components or influences from the interference signal 118.

The interference signal 118 can correspond to an interference communication scheme 124 representing or controlling one or more processes associated with intending to communicate the interference content 120. The interference communication scheme 124 can be similar in type or nature as the serving communication scheme 110 but for communicating the interference content 120. The interference communication scheme 124 can include the MCS, or a value or a parameter associated therewith for the interference signal 118.

The computing system 100 can include the interference communication scheme 124 determined for the unintended device receiving the interference signal 118 or influences thereof through the receiver signal 114. For example, the computing system 100 can include the interference communication scheme 124 communicated to the first device 102 through or from the second device 106. Also for example, the computing system 100 can include the interference communication scheme 124 determined at or by the first device 102. Details regarding the interference communication scheme 124 are described below.

The interference signal 118 can traverse and be affected from an interference channel 126. The interference channel 126 can be similar to the serving channel 116 but corresponding to the unintended receiving device and the interference source 122. For example, the interference channel 126 can include the connection, the environment, the communication control detail or parameters, influences or affects, or a combination thereof between the first device 102 and the interference source 122.

The computing system 100 can calculate a serving channel estimate 128, an interference channel estimate 130, or a combination thereof. The serving channel estimate 128 can include a representation or a quantification of influences, effects, or changes on the serving signal 112 from traversing the serving channel 116. The interference channel estimate 130 can include a representation or a quantification of influences, effects, or changes on the interference signal 118 from traversing the interference channel 126. The serving channel estimate 128, the interference channel estimate 130, or a combination thereof can include a matrix, a scalar, or a combination thereof.

The computing system 100 can determine the serving channel estimate 128, the interference channel estimate 130, or a combination thereof based on a variety of method. For example, the computing system 100 can utilize known or previously determined information regarding the communication channels, such as channel information or channel models predetermined by the computing system 100. Also for example, the computing system 100 or the receiving device therein can determine the serving channel estimate 128, the interference channel estimate 130, or a combination thereof based on a reference portion contained in transmitted signals.

The reference portion can include known or designated information transmitted by a device used to determine various types of information at a receiving device. The reference portion can include a bit, a symbol, a signal pattern, signal strength, frequency, phase, duration, or a combination thereof predetermined by the computing system 100, a standard, or a combination thereof.

The reference portion can be unique to each instance of transmitting device, intended receiver, a communication block, an instance of communication, a cell, or a combination thereof. The details of the reference portion can be known and used by one, multiple, or all devices in the computing system 100. For example, the receiving device can determine the channel estimate as a difference between a known instance of the reference portion and received instance of the reference portion.

The communication of the serving content 108 for the computing system 100 can be described as:

$$y(k)=H_d x_d(k)+H_i x_i(k)+n(k). \qquad \text{Equation (1).}$$

The receiver signal 114 can be represented as '$y(k)$'. The serving channel 116 or the serving channel estimate 128 can be represented as '$H_d$'. The serving signal 112 can be represented as '$x_d(k)$'. The interference channel 126 or the interference channel estimate 130 can be represented as '$H_i$'. The interference signal 118 can be represented as '$x_i(k)$'. The noise parameter can be represented as '$n(k)$'.

Similarly for a MIMO communication scheme, such as for a 2×2 system, the communication of the serving content 108 for the computing system 100 can be described as:

$$y(k)=h_{1,d}x_{d1}(k)+h_{2,d}x_{d2}(k)+h_{1,i}x_{i1}(k)+h_{2,i}x_{i2}(k)+n(k). \qquad \text{Equation (2).}$$

The serving channel 116 or the serving channel estimate 128 for each spatial stream can be represented as '$H_d=[h_{1,d}\ h_{2,d}]$'. The serving signal 112 similarly can be represented as '$x_d=[x_{d1}(k)\ x_{d2}(k)]^T$'. The interference channel 126 or the interference channel estimate 130 can be represented as '$H_i=[h_{1,i}\ h_{2,i}]$'. The interference signal 118 can be represented as '$x_i=[x_{i1}(k)\ x_{i2}(k)]^T$'.

The computing system 100 can use an interference-aware receiver (JAR) 132 to communicate information. The interference-aware receiver 132 can include the interference-aware receiver 132 for processing the receiver signal 114.

The interference-aware receiver 132 is a device or a portion thereof configured to process, recognize, and utilize the interference content 120 in processing for or recovering the serving content 108. The interference-aware receiver 132 can utilize soft decisions in processing interference information, the serving information, or a combination thereof.

For example, the interference-aware receiver 132 can detect, decode, or a combination thereof for the interference signal 118 and the interference content 120 from the receiver signal 114. The interference-aware receiver 132 can use the interference content 120, a portion thereof, or a processing result thereof in detecting, decoding, or a combination thereof for the serving content 108.

The computing system 100 can include various elements or parameters for processing and communicating the serving content 108. For example, the computing system 100 can utilize a block error rate 134, a serving-channel free capacity 136, an interference-channel free capacity 138, a sum-rate capacity 140, a serving link metric 142, an interference link metric 144, or a combination thereof.

The block error rate 134 can include an amount of errors associated with a unit of information. The block error rate 134 can include a number or a quantity of processing errors, processing iterations, or a combination thereof for a transmission block or a packet of information. The block error rate 134 can further include a frequency in occurrence of communication blocks that are not successfully decoded at the receiving device.

The serving-channel free capacity 136 is a representation of a capability or an efficiency of communication over the serving channel 116 without any influences from interfering sources. The serving-channel free capacity 136 can include a speed or an amount of information capable of being communicated over the serving channel 116 when no instances of the interference signal 118 is present. The serving-channel free capacity 136 can include transmission capacity of the serving channel 116 when no instances of the interference signal 118 are affecting the data exchange.

The serving-channel free capacity 136 can include interference-free capacity for the serving channel 116. The serving-channel free capacity 136 can be represented as '$C_d$'.

The interference-channel free capacity 138 is a representation of a capability or an efficiency of communication over the interference channel 126 without any influences from other transmitting sources. The interference-channel free capacity 138 can include a speed or an amount of information capable of being communicated over the interference channel 126 when no instances of other transmitted signals are affecting the data exchange, including absence of the serving signal 112. The interference-channel free capacity 138 can include transmission capacity of the interference channel 126 when no instances of other transmitted signals are affecting the data exchange, including absence of the serving signal 112 affecting the data exchange.

The interference-channel free capacity 138 can include interference-free capacity for the interference channel 126. The interference-channel free capacity 138 can be represented as '$C_i$'.

The sum-rate capacity 140 is a representation of a capability or an efficiency of communication over a communication channel when both serving and interfering signals are jointly decoded. The sum-rate capacity 140 can include a speed or an amount of information capable of being communicated over a communication channel when both serving and interfering signals are jointly decoded. The sum-rate capacity 140 can be represented as '$C_{sumrate}$'.

The sum-rate capacity 140 can represent the amount of information capable of being communicated over the serving channel 116 when both the serving signal 112 and interference signal 118 are jointly decoded. The sum-rate capacity 140 can also represent the amount of information capable of being communicated over the interference channel 126 when both the serving signal 112 and interference signal 118 are jointly decoded.

For example, the sum-rate capacity 140 can be based on whitening the signals from other sources. Also for example, the sum-rate capacity 140 can correspond to of the multiple access (MAC) channel.

The serving link metric 142 is a description or a representation of a trait or a characteristic of the serving channel 116 likely available for exchanging data. The serving link metric 142 can include the channel capacity likely and practically available for communicating information between devices. The serving link metric 142 can describe or represent a likely and a practical environment for the interference or an effect therefrom for communicating the serving content 108.

The serving link metric 142 can be associated with the serving channel estimate 128, the interference channel estimate 130, or a combination thereof. The serving link metric 142 can further be associated with the serving-channel free capacity 136, the interference-channel free capacity 138, the sum-rate capacity 140, or a combination thereof.

For example, the serving link metric 142 can be a weighted average between the interference-free capacity and the capacity when treating the interference as noise for the serving channel 116. Also for example, the serving link metric 142 can be based on:

$$m_d = \alpha_d C_d + (1-\alpha_d)(C_{sumrate} - C_i).$$ Equation (3).

The serving link metric 142 can be represented as '$m_d$'.

The serving link metric 142 can be based on a serving adjustment 146, represented as '$\alpha_d$'. The serving adjustment 146 can include a factor or a scalar for emphasizing different affects or characteristics of the likely environment. The serving adjustment 146 can include a number ranging from zero to one, such as '$0 \leq \alpha_d \leq 1$'.

The interference link metric 144 is a description or a representation of a trait or a characteristic of the interference channel 126 likely available for exchanging data. The interference link metric 144 can include the channel capacity likely and practically available or occurring for communicating information between devices. The interference link metric 144 can describe or represent a likely and a practical environment for the other interfering signals or an effect therefrom, including the serving signal.

The interference link metric 144 can be associated with the interference channel estimate 130, the serving channel estimate 128, or a combination thereof. The interference link metric 144 can further be associated with the serving-channel free capacity 136, the interference-channel free capacity 138, the sum-rate capacity 140, or a combination thereof.

For example, the interference link metric 144 can be a weighted average between the interference-free capacity and the capacity when treating the interference from other source as noise for the interference channel 126. Also for example, the interference link metric 144 can be based on:

$$m_i = \alpha_i C_i + (1-\alpha_i)(C_{sumrate} - C_d).$$ Equation (4).

The interference link metric 144 can be represented as '$m_i$'. The interference link metric 144 can be based on an interference adjustment 148, represented as '$\alpha_i$'. The interference adjustment 148 can include a factor or a scalar for emphasizing different affects or characteristics of the likely environment. The interference adjustment 148 can include a number ranging from zero to one, such as '$0 \leq \alpha_i \leq 1$'.

The interference adjustment 148 and the serving adjustment 146 can be based on summing to a value of 1. For example, the interference adjustment 148 and the serving adjustment 146 can be represented as '$\alpha_d + \alpha_i = 1$' for ideal decoders. For non-linear decoders and likely practical environments, the interference adjustment 148 and the serving adjustment 146 can be represented as '$\alpha_d \neq 1-\alpha_i$'. As a more specific example, the interference adjustment 148 and the serving adjustment 146 can be represented as '$0 \leq (\alpha_i = \alpha_d) \leq 1$', '$\alpha_d + \alpha_i = 1$', '$\alpha_d \neq 1-\alpha_i$', or a combination thereof.

The computing system 100 can calculate or predetermine the interference adjustment 148, the serving adjustment 146, or a combination thereof. Details regarding the interference adjustment 148 and the serving adjustment 146 are described below.

The computing system 100 can utilize a linear combination mechanism 150 for the serving link metric 142 and the interference link metric 144. The linear combination mechanism 150 can include a method or a process based on constructing a set of terms from using a constant or a scalar for each of the terms and combining the results.

The computing system 100 can use linear combination mechanism 150 to calculate the serving link metric 142, the interference link metric 144, a combined result thereof, or a combination thereof, such as for Equation (3) and Equation (4). Details regarding the serving link metric 142 and the interference link metric 144 are discussed below.

The computing system 100 can utilize a target rate 152, an interference-based feedback mechanism 154, or a combination thereof to control or influence the communication of data. The target rate 152 can include an objective or an achievable quality for the communication. For example, the target rate 152 can include a targeted instance or value of the block error rate 134, communication throughput rate or speed, or a combination thereof.

The interference-based feedback mechanism 154 is a method or a process for generating feedback information for controlling or influencing the communication of the serving content 108 or a subsequent instance thereof directly using information regarding the interference signal 118. The interference-based feedback mechanism 154 can control or influence selection of the serving communication scheme 110.

The interference-based feedback mechanism 154 can use information regarding the interference signal 118, the interference channel 126, or a combination thereof as direct inputs for generating the feedback information. For example, the interference-based feedback mechanism 154 can utilize the interference channel estimate 130, the interference communication scheme 124, the interference link metric 144, or a combination thereof as input dictating generation of the feedback information.

The interference-based feedback mechanism 154 can further use information regarding the serving signal 112, the serving channel 116, or a combination thereof for generating the feedback information. For example, the interference-based feedback mechanism 154 can utilize the serving channel estimate 128, the serving communication scheme 110, the serving link metric 142, or a combination thereof as input dictating generation of the feedback information.

The interference-based feedback mechanism 154 can include a look up table (LUT). For example, the interference-based feedback mechanism 154 can include a non-linear mapping for the serving channel estimate 128, the serving communication scheme 110, the serving link metric 142, the interference channel estimate 130, the interference communication scheme 124, the interference link metric 144, or a combination thereof with the target rate 152.

The interference-based feedback mechanism 154 can include a mechanism complexity order 156. The mechanism complexity order 156 is a description or a representation of a processing load for the interference-based feedback mechanism 154. The mechanism complexity order 156 can include a number of input parameters or categories, a number of dimensions for the LUT, or a combination thereof. As a more specific example, the mechanism complexity order 156 of the interference-based feedback mechanism 154 described herein can be less than or equal to four, such as less than or equal to four input parameters or categories, or less than or equal to four dimensions.

The computing system 100 can generate the interference-based feedback mechanism 154 based on mapping various parameters with the target rate 152. The computing system 100 can further select an instance of the target rate 152 and use the information regarding the interference signal 118, the interference channel 126, or a combination thereof with the interference-based feedback mechanism 154 to determine the serving communication scheme 110 likely to provide the target rate 152.

The computing system 100 can generate a receiver feedback 158 as the feedback information. The receiver feedback 158 can include information communicated from the intended receiving device back to the transmitting device. The receiver feedback 158 can include information associated with the received data quality, channel information, desired settings, processing results, or a combination thereof. For example, the receiver feedback 158 can include a channel feedback information 160, a negative acknowledgement (NACK) 162, or a combination thereof from the first device 102 back to the second device 106.

The channel feedback information 160 can include information associated with quality of the received data, information regarding the communication channel, desired settings associated therewith, or a combination thereof determined by the receiving device based on processing the receiver signal 114. For example, the channel feedback information 160 can include the serving channel estimate 128, the interference channel estimate 130, the serving communication scheme 110, channel quality indicator (CQI), or a combination thereof.

The negative acknowledgement 162 can include a notification regarding a failure in processing for the serving content 108 from the receiver signal 114. The negative acknowledgement 162 can be based on a decoding error, a checksum error, or a combination thereof at the receiving device. The negative acknowledgement 162 can be associated with a retransmission of the serving content 108. The negative acknowledgement 162 can also be basis for the block error rate 134.

The computing system 100 can implement the various mechanisms described above in various ways. For example, the computing system 100 can implement the linear combination mechanism 150, the interference-based feedback mechanism 154, or a combination thereof using hardware, software, firmware, or a combination thereof. As a more specific example, the various mechanisms can be implemented using circuits, active or passive, gates, arrays, feedback loops, feed-forward loops, hardware connections, functions or function calls, instructions, equations, data manipulations, structures, addresses, or a combination thereof.

For illustrative purposes, the computing system 100 will be described from the perspective of the first device 102 and the second device 106 intending to communicate with each other using the serving signal 112 and receiving the interference signal 118 unintended for the first device 102. However, it is understood that the computing system 100 can utilize the below described processes for communicating between or from the perspective of the first device 102, the second device 106, the interference source 122, or a combination thereof. For example, the computing system 100 can use the second device 106 and the interference source 122 for MAC channel communication, joint-transmission, coordinated communication, or a combination thereof.

Also for illustrative purposes, the interference signal 118 is described as communication from the interference source 122 as a base station. However, it is understood that the interference signal 118 can be any information unintended for the receiving device at that time, such as from a base station or a UE.

For further illustrative purposes, the computing system 100 is described as the base station communicating information to the mobile device, such as the base station transmitting and the mobile device receiving the information. However, it is understood that the mobile device can communicate directly to each other or to the base station.

For further illustrative purposes, the computing system 100 is described as having one instance of the serving signal 112 and one instance of the interference signal 118 relative to communicating between the first device 102 and the second device 106. However, it is understood that the computing system 100 can experience and process for multiple interference signals and sources. The computing system 100 can further coordinate the communication of signals with two or more instances of the base stations.

Figure 2:
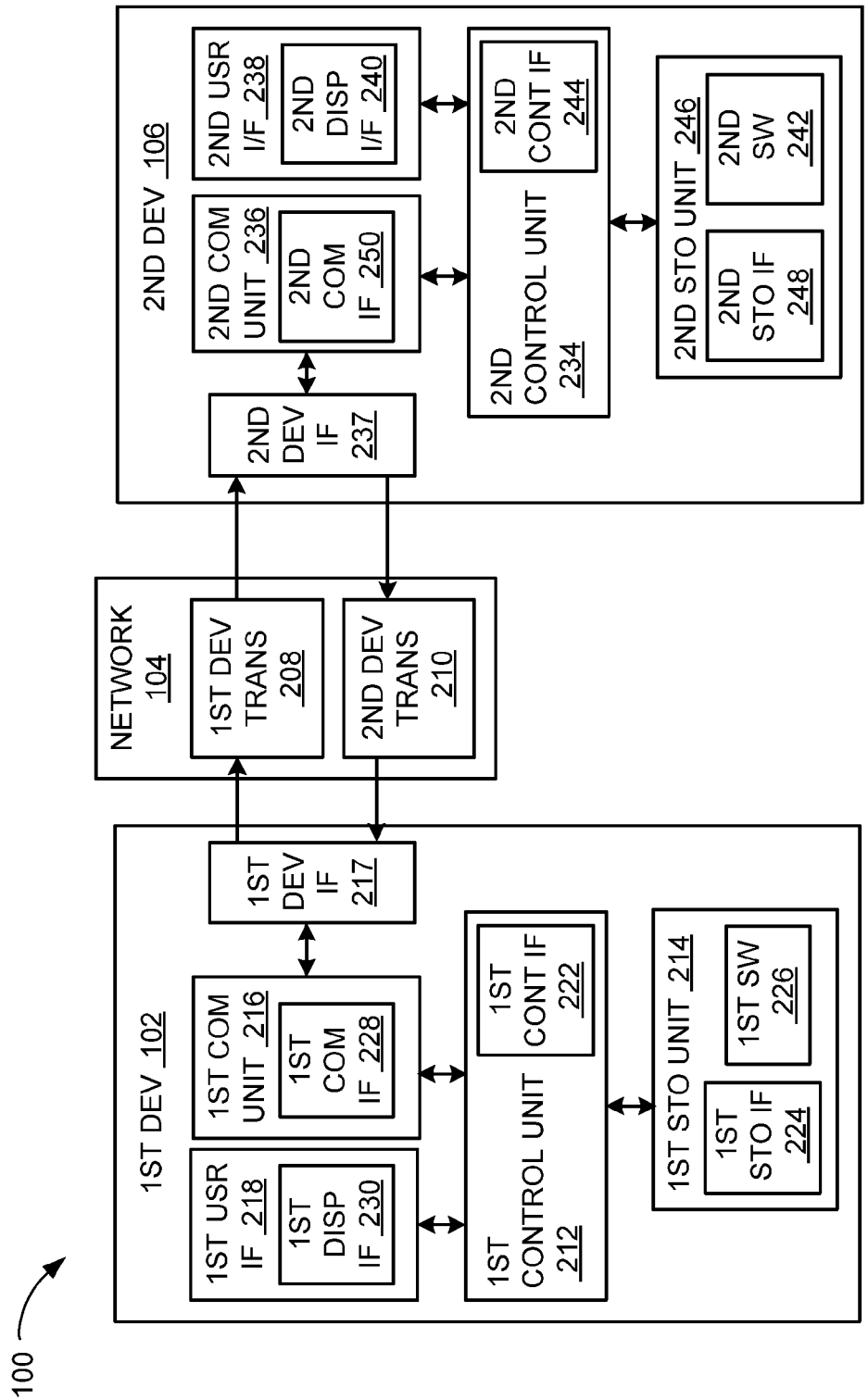
FIG. 2 is an exemplary block diagram of the computing system.

Referring now to FIG. 2, therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first inter-device interface 217. The first inter-device interface 217 can be a device or a portion of a device for physically communicating signals with a separate device. The first inter-device interface 217 can communicate by transmitting or receiving signals to or from another device. The first inter-device interface 217 can include one or more antennas for wireless signals, a physical connection and receiver-transmitter for wired signals, or a combination thereof. The first inter-device interface 217 can include an omnidirectional antenna, a wire, an antenna chip, a ceramic antenna, or a combination thereof. The first inter-device interface 217 can further include a port, a wire, a repeater, a connector, a filter, a sensor, or a combination thereof.

The first inter-device interface 217 can detect or respond to a power in electromagnetic waves and provide the detected result to the first communication unit 216 to receive a signal, including the second device transmission 210. The first inter-device interface 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second inter-device interface 237. The second inter-device interface 237 can be a device or a portion of a device for physically communicating signals with a separate device. The second inter-device interface 237 can communicate by transmitting or receiving signals to or from another device. The second inter-device interface 237 can include one or more antennas for wireless signals, a physical connection and receiver-transmitter for wired signals, or a combination thereof. The second inter-device interface 237 can include an omnidirectional antenna, a wire, an antenna chip, a ceramic antenna, or a combination thereof. The second inter-device interface 237 can further include a port, a wire, a repeater, a connector, a filter, a sensor, or a combination thereof.

The second inter-device interface 237 can detect or respond to a power in electromagnetic waves and provide the detected result to the second communication unit 236 to receive a signal, including the first device transmission 208. The second inter-device interface 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Referring now to FIG. 3, therein is shown a control flow of the computing system 100. The computing system 100 can include a mechanism generator module 302, a mechanism distribution module 304, a transmission module 306, a receiver module 308, or a combination thereof.

The mechanism generator module 302 can be coupled with the mechanism distribution module 304, which can be further coupled with the transmission module 306, receiver module 308, or a combination thereof. The transmission module 306 can be further coupled with the receiver module 308.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the mechanism generator module 302 can be connected to one or more inputs or outputs of the mechanism distribution module 304 using conductors or the communication channel without intervening modules or devices there-between for direct coupling. Also for example, the mechanism generator module 302 can be coupled to the mechanism distribution module 304 indirectly using a wireless channel with a repeater, a switch, a routing device, or a combination thereof. The mechanism generator module 302, the mechanism distribution module 304, the transmission module 306, the receiver module 308, or a combination thereof can be coupled in similar ways as described above.

The computing system 100 can communicate information between devices, such as by sending, transmitting, receiving, coding, decoding, or a combination thereof. The receiving device can further communicate with the user by displaying images, recreating sounds, exchanging process steps or instructions, or a combination thereof according to the information communicate to the device.

The mechanism generator module 302 is configured to generate the interference-based feedback mechanism 154 of FIG. 1. The mechanism generator module 302 can generate the interference-based feedback mechanism 154 for communicating the serving content 108 of FIG. 1, the interference content 120 of FIG. 1, or a combination thereof with devices of computing system 100. For example, the mechanism generator module 302 can generate the interference-based feedback mechanism 154 for communicating with the first device 102 of FIG. 1, the second device 106 of FIG. 1, the interference source 122 of FIG. 1, or a combination thereof.

The mechanism generator module 302 can use the base station, the coordinating device, or a combination thereof to generate the interference-based feedback mechanism 154. For example, the mechanism generator module 302 can use the first device 102, the second device 106, the interference source 122, the coordinating device or a combination thereof to generate the interference-based feedback mechanism 154. Details regarding the mechanism generator module 302 will be described below.

After generating the interference-based feedback mechanism 154, the control flow can pass to the mechanism distribution module 304. The control flow can pass through a variety of ways. For example, control flow can pass by having processing results of one module passed to another module, such as by passing the interference-based feedback mechanism 154 from the mechanism generator module 302 to the mechanism distribution module 304, by storing the processing results at a location known and accessible to the other module, such as by storing the interference-based feedback mechanism 154 at a storage location known and accessible to the mechanism distribution module 304, by notifying the other module, such as by using a flag, an interrupt, a status signal, or a combination for the mechanism distribution module 304, or a combination of processes thereof.

The mechanism distribution module 304 is configured to communicate the interference-based feedback mechanism 154. The mechanism distribution module 304 can communicate the interference-based feedback mechanism 154 based on sending, receiving, storing, loading, enabling, or a combination thereof for the interference-based feedback mechanism 154 using one or more devices in the computing system 100, such as the first device 102, the second device 106, the coordinating device, or a combination thereof.

For example, the mechanism distribution module 304 can use the first inter-device interface 217 of FIG. 2, the second inter-device interface 237 of FIG. 2, the first communication unit 216 of FIG. 2, the second communication unit 236 of FIG. 2, or a combination thereof to send, receive or a combination thereof for the interference-based feedback mechanism 154. Also for example, the mechanism distribution module 304 can use the device interface, backhaul channel, communication unit, or a combination thereof for the coordinating device to communicate the interference-based feedback mechanism 154.

Also for example, the mechanism distribution module 304 can use the first control interface 222 of FIG. 2, the second control interface 244 of FIG. 2, the first storage interface 224 of FIG. 2, the second storage interface 248 of FIG. 2, the first control unit 212 of FIG. 2, the second control unit 234 of FIG. 2, or a combination thereof to load, enable, or a combination thereof for the interference-based feedback mechanism 154. Also for example, the mechanism distribution module 304 can store the interference-based feedback mechanism 154 in the first storage unit 214 of FIG. 2, the second storage unit 246 of FIG. 2, the first communication unit 216, the second communication unit 236, the storage unit of the coordinating device, the communication unit of the coordinating device, or a combination thereof.

After communicating the interference-based feedback mechanism 154, the control flow can be passed from the mechanism distribution module 304 to the transmission module 306. The control flow can pass similarly as described above between the mechanism generator module 302 and the mechanism distribution module 304 but using processing results of the mechanism distribution module 304, such as the interference-based feedback mechanism 154.

The transmission module 306 is configured to communicate the serving content 108. The transmission module 306 can communicate by sending or transmitting the serving signal 112 of FIG. 1 corresponding to the serving content 108.

The transmission module 306 can transmit the serving signal 112 based on processing the serving content 108. The transmission module 306 can transmit the serving signal 112 according to the serving communication scheme 110 of FIG. 1.

For example, the transmission module 306 can generate code words corresponding to the serving content 108 according to a coding mechanism, such as turbo coding mechanism or polar coding mechanism, a coding rate, or a combination thereof according to the serving communication scheme 110. Also for example, the transmission module 306 can transmit the serving signal 112 according to a modulation scheme or constellation according to the serving communication scheme 110.

The transmission module 306 can transmit the serving signal 112 using the first inter-device interface 217, the second inter-device interface 237, the first communication unit 216, the second communication unit 236, or a combination thereof. The transmission module 306 can process the serving content 108 for transmitting the serving signal 112 using the first communication unit 216, the second communication unit 236, the first control unit 212, the second control unit 234, or a combination thereof. The transmission module 306 can store the serving signal 112 using the first communication unit 216, the second communication unit 236, the first storage unit 214, the second storage unit 246, or a combination thereof.

After transmitting the serving signal 112, the control flow can be passed from the transmission module 306 to the receiver module 308. The control flow can pass similarly as described above between the mechanism generator module 302 and the mechanism distribution module 304 but using processing results of the transmission module 306, such as the serving signal 112.

The receiver module 308 is configured to receive and process the serving content 108. The receiver module 308 can receive the receiver signal 114 of FIG. 1 corresponding to or including the serving signal 112, the interference signal 118 of FIG. 1, or a combination thereof.

The receiver module 308 can process the receiver signal 114 to recover or estimate the serving content 108. The receiver module 308 can include a signal detection module 310, a channel analysis module 312, an interference processing module 314, a serving content module 316, a feedback module 318, or a combination thereof for receiving and processing the receiver signal 114.

The signal detection module 310 is configured to receive the receiver signal 114. The signal detection module 310 can receive the receiver signal 114 including or corresponding to the serving signal 112, the interference signal 118, or a combination thereof for communicating serving content 108 contemporaneously with interference signal 118.

The signal detection module 310 can use the first inter-device interface 217, the second inter-device 237, the first communication unit 216, the second communication unit 236, or a combination thereof to receive the receiver signal 114. The signal detection module 310 can store the receiver signal 114 in the first communication unit 216, the second communication unit 236, the first storage unit 214, the second storage unit 246, or a combination thereof.

For example, the signal detection module 310 can use one or more antennas or ports on the first device 102, the second device 106, or a combination thereof to detect voltage, current, energy, power, fluctuations or oscillations, or a combination thereof to receive the receiver signal 114. Also for example, the signal detection module 310 can store the voltage, the current, the energy, the power, the fluctuations or the oscillations, or a combination thereof to receive the receiver signal 114.

After receiving the receiver signal 114, the control flow can be passed from the signal detection module 310 to the channel analysis module 312. The control flow can pass similarly as described above between the mechanism generator module 302 and the mechanism distribution module 304 but using processing results of the signal detection module 310, such as the receiver signal 114.

The channel analysis module 312 is configured to analyze communication channel corresponding to the receiver signal 114. The channel analysis module 312 can analyze the communication channel using the reference portion within the serving signal 112, the interference signal 118, or a combination thereof.

The channel analysis module 312 can analyze the communication channel including the serving channel 116 of FIG. 1, the interference channel 126 of FIG. 1, or a combination thereof. The channel analysis module 312 can calculate the serving channel estimate 128 of FIG. 1, the interference channel estimate 130 of FIG. 1, or a combination thereof corresponding to the serving channel 116, the interference channel 126, or a combination thereof.

The channel analysis module 312 can further analyze the communication channel corresponding to the receiver signal 114. For example, the channel analysis module 312 can determine the serving-channel free capacity 136 of FIG. 1, the interference-channel free capacity 138 of FIG. 1, the sum-rate capacity 140 of FIG. 1, or a combination thereof.

The channel analysis module 312 can determine the serving-channel free capacity 136, the interference-channel free capacity 138, the sum-rate capacity 140, or a combination thereof based on mutual information associated with the receiver signal 114. The mutual information can be represented as:

$$I(x_1, x_2; y) = I(x_1; y|x_2) + I(x_2; y).$$ Equation (5).

The receiver signal 114 can be represented as 'y'. The serving signal 112 can be represented as '$x_1$'. The interference signal 118 can be represented as '$x_2$'. The mutual information can be represented as 'I( )'.

The first term can represent the mutual information when the interference signal 118 is fully known, such as for interference free decoding of the serving signal 112. The second term can represent the mutual information when decoding the interference signal 118 alone, assuming the serving signal 112 is unknown. The mutual information can further be represented as:

$$I(x_1, x_2; y) = \log_2 \det\left(1 + \frac{1}{\sigma^2} HH^H\right).$$ Equation (6)

The channel analysis module 312 can determine the mutual information based on the channel estimate, represented as 'H', such as the serving channel estimate 128, the interference channel estimate 130, or a combination thereof. The channel analysis module 312 can further determine the mutual information based on the noise parameter, represented as '$\sigma^2$'.

The channel analysis module 312 can determine the mutual information for the serving signal 112, the interference signal 118, or a combination thereof including symbols chosen from a finite order constellation based on:

$$MIB(H) = \sum_{i=1}^{P} \log_2 M_i - \lim_{N \to \infty} \frac{1}{N} \sum_{n=1}^{N} \sum_{k=1}^{\Sigma \log_2 M_t} \log_2 \left( \frac{\sum_{X \in S} p(Y_n | X)}{\sum_{X'_k \in S_k^{x_n}} p(Y_n | X'_k)} \right).$$ Equation (7)

The mutual information per bit (MIB) can represent the mutual information.

For MIMO communication schemes, the mutual information can be determined based on summing up individual SISO mutual information per stream. The MIB for MIMO communication can be represented as:

$$MIB_{MIMO} = MIB_{SISO}(\overline{SNR}_1) + MIB_{SISO}(\overline{SNR}_2).$$ Equation (8).

The term '$MIB_{SISO}(\overline{SNR}_1)$' or '$MIB_{SISO}(\overline{SNR}_2)$' can be based on Equation (5) or a portion therein. The term 'SNR' can represent signal-to-noise ratio for the serving signal 112, the interference signal 118, or a combination thereof. The term '$\overline{SNR}$' can represent average SNR per stream.

The channel analysis module 312 can determine the mutual information as the serving-channel free capacity 136, the interference-channel free capacity 138, the sum-rate capacity 140, or a combination thereof corresponding to the analyzed channel. The channel analysis module 312 can further determine the mutual information as the serving-channel free capacity 136, the interference-channel free capacity 138, the sum-rate capacity 140, or a combination thereof for the serving signal 112, the interference signal 118, or a combination thereof based on the Gaussian distribution.

The channel analysis module 312 can determine the serving-channel free capacity 136, the interference-channel free capacity 138, the sum-rate capacity 140, or a combination thereof using information predetermined by the computing system 100. The channel analysis module 312 can further determine the serving-channel free capacity 136, the interference-channel free capacity 138, the sum-rate capacity 140, or a combination thereof dynamically based on the receiver signal 114.

The channel analysis module 312 can further calculate link metric for representing the communication channel. The channel analysis module 312 can calculate the serving link metric 142 of FIG. 1, the interference link metric 144 of FIG. 1, or a combination thereof. The channel analysis module 312 can calculate the serving link metric 142 for representing the serving channel 116 corresponding to communication of the serving content 108. The channel analysis module 312 can calculate the interference link metric 144 for representing the interference channel 126 corresponding to the interference signal 118.

The channel analysis module 312 can further calculate the serving link metric 142 and the interference link metric 144 contemporaneously. For example, the channel analysis module 312 can contemporaneously calculate the serving link metric 142 with the interference link metric 144 based on the linear combination mechanism 150 of FIG. 1.

As a more specific example, the channel analysis module 312 can calculate the serving link metric 142 and the interference link metric 144 contemporaneously based on the linear combination mechanism 150 according to:

$MIB_d = \alpha_d \cdot MIB_{MIMO}(H_d) + (1-\alpha_d) \cdot MIB_{MIMO}(\overline{H}_d)$, $MIB_i = \alpha_i \cdot MIB_{MIMO}(H_i) + (1-\alpha_i) \cdot MIB_{MIMO}(\overline{H}_i)$.   Equation (9).

The channel analysis module 312 can calculate the serving link metric 142, represented as '$MIB_d$', based on the serving adjustment 146 of FIG. 1, represented as '$\alpha_d$'. The channel analysis module 312 can calculate the interference link metric 144, represented as '$MIB_i$' based on the interference adjustment 148 of FIG. 1, represented as '$\alpha_i$'.

The channel analysis module 312 can further calculate the serving link metric 142 based on the serving channel estimate 128, represented as '$H_d$', the serving channel 116 whitened by the interference plus noise, represented as $$'\overline{H}_d = \left(1 + \frac{1}{\sigma^2} H_i H_i^H\right)^{-\frac{1}{2}} H_d.$$

The channel analysis module 312 can further calculate the interference link metric 144 based on the interference channel estimate 130, represented as '$H_i$', the interference channel 126 whitened by the serving signal 112 plus noise, represented as $$'\overline{H}_i = \left(1 + \frac{1}{\sigma^2} H_d H_d^H\right)^{-\frac{1}{2}} H_i.$$

The channel analysis module 312 can further calculate the interference link metric 144 and the serving link metric 142 based on the serving-channel free capacity 136, the interference-channel free capacity 138, the sum-rate capacity 140, or a combination thereof for representing the serving channel 116, the interference channel 126, or a combination thereof. For example, the channel analysis module 312 can calculate the interference link metric 144 and the serving link metric 142 according to:

$m_d = \alpha_d C_d + (1-\alpha_d)(C_{sumrate} - C_i)$, $m_i = \alpha_i C_i + (1-\alpha_i)(C_{sumrate} - C_d)$.   Equation (10).

The interference link metric 144 can be represented as '$m_i$' and the serving link metric 142 can be represented as '$m_d$' for Equation (10).

The channel analysis module 312 can further calculate the interference link metric 144 and the serving link metric 142 according to:

$$R_d = \alpha_d \cdot \log_2 \det\left(1 + \frac{1}{\sigma^2} H_d H_d^H\right) +$$

$$(1-\alpha_d) \cdot \log_2 \det\left(I + \frac{1}{\sigma^2} H_d P_i^\perp H_d^H\right),$$

$$R_i = \alpha_i \cdot \log_2 \det\left(1 + \frac{1}{\sigma^2} H_i H_i^H\right) +$$

$$(1-\alpha_i) \cdot \log_2 \det\left(I + \frac{1}{\sigma^2} H_{ii} P_d^\perp H_i^H\right).$$

Equation (11)

For Equation (11), the serving link metric 142 can be represented as '$R_d$' for the desired rate, such as for the target rate 152, and the interference link metric 144 can be represented as '$R_i$'.

The serving link metric 142 or the target rate 152 can be based on the serving channel estimate 128, the interference channel estimate 130, the noise parameter, the serving adjustment 146, the interference adjustment 148, or a combination thereof. Also, the term '$P_i^\perp$' can represent $$P_i^\perp = \left(1 + \frac{1}{\sigma^2} H_i h_i^H\right)^{-1} = I - H_i(\sigma^2 I + H_i^H H_i)^{-1} H_i^H.$$

The channel analysis module 312 can calculate the interference link metric 144 and the serving link metric 142 based on the linear combination mechanism 150. The linear combination mechanism 150 can be represented by Equation (9), Equation (10), Equation (11), or a combination thereof including a scalar, a constant or an offset, or a combination thereof.

The channel analysis module 312 can use the first communication unit 216, the second communication unit 236, the first control unit 212, the second control unit 234, or a combination thereof to analyze the communication channel, including calculating the interference link metric 144, the serving link metric 142, or a combination thereof. The channel analysis module 312 can store the analysis result of the communication channel, including the interference link metric 144, the serving link metric 142, or a combination thereof in the first communication unit 216, the second communication unit 236, the first storage unit 214, the second storage unit 246, or a combination thereof.

After receiving the receiver signal 114, the control flow can be passed from the channel analysis module 312 to the interference processing module 314. The control flow can pass similarly as described above between the mechanism generator module 302 and the mechanism distribution module 304 but using processing results of the channel analysis module 312, such as analysis result of the communication channel, including the interference link metric 144, the serving link metric 142, or a combination thereof.

The interference processing module 314 is configured to process the interference signal 118 in processing for the serving content 108. The interference processing module 314 can determine the interference communication scheme 124 of FIG. 1 for the interference signal 118 included in or influencing the receiver signal 114. The interference processing module 314 can determine the interference communication scheme 124 for representing the interference signal 118.

The interference processing module 314 can determine the interference communication scheme 124 for or using the interference-aware receiver 132 of FIG. 1. The interference processing module 314 can determine the interference communication scheme 124 in a variety of ways. For example, the interference processing module 314 can determine the interference communication scheme 124 for representing the interference communication scheme 124 received from a serving base station for the receiving device, such as from or through the second device 106 serving the first device 102.

Continuing with the example, the interference processing module 314 can use the interference-aware receiver 132 to request the second device 106 to provide the interference communication scheme 124. The second device 106 can communicate with the interference source 122 to identify the interference communication scheme 124 utilized for the interference signal 118 included in the receiver signal 114. The second device 106 can relay information regarding the interference communication scheme 124 from the interference source 122 to the first device 102 being served by the second device 106.

Also for example, the interference processing module 314 can determine the interference communication scheme 124 for representing the interference communication scheme 124 determined at the receiving device based on the receiver signal 114. The interference processing module 314 can determine the interference communication scheme 124 at the first device 102 based on the receiver signal 114 including or corresponding to the interference signal 118. The interference processing module 314 can use the interference-aware receiver 132 to determine the interference communication scheme 124 using a variety of methods, such as minimum mean-square error estimation, trial-and-error, a derivation thereof, or a combination thereof.

The interference processing module 314 can further process the receiver signal 114 according to the interference communication scheme 124 to recognize or identify the interference signal 118, the interference content 120 of FIG. 1, or a combination thereof included in the receiver signal 114. The interference processing module 314 can use the interference-aware receiver 132 to process the receiver signal 114 and recognize or identify the interference signal 118, the interference content 120, or a combination thereof. The computing system 100 can use the interference signal 118, the interference content 120, or a combination thereof identified or recognized at the receiving device in processing for the serving content 108.

The interference processing module 314 can use the first communication unit 216, the second communication unit 236, the first inter-device interface 217, the second inter-device interface 237, inter-device interface or communication unit of the coordinating device, inter-device interface or communication unit of the interference source 122, or a combination thereof to determine the interference communication scheme 124. The interference processing module 314 can use the first communication unit 216, the second communication unit 236, the first control unit 212, the second control unit 234, or a combination thereof to further determine the interference communication scheme 124.

The interference processing module 314 can use the first communication unit 216, the second communication unit 236, the first control unit 212, the second control unit 234, or a combination thereof to identify or recognize the interference content 120, the interference signal 118, or a combination thereof. The interference processing module 314 can store the analysis result, including the interference communication scheme 124, the interference signal 118, the interference content 120, or a combination thereof in the first communication unit 216, the second communication unit 236, the first storage unit 214, the second storage unit 246, or a combination thereof.

After processing the interference signal 118, the control flow can be passed from the interference processing module 314 to the serving content module 316. The control flow can pass similarly as described above between the mechanism generator module 302 and the mechanism distribution module 304 but using processing results of the interference processing module 314, such as the interference communication scheme 124, the interference signal 118, the interference content 120, or a combination thereof.

The serving content module 316 is configured to process for the serving content 108. The serving content module 316 can detect, decode, or a combination thereof for the receiver signal 114 to recognize, recover, or estimate the serving signal 112, the serving content 108, or a combination thereof from the receiver signal 114.

For example, the serving content module 316 can calculate likelihood values, such as logarithmic likelihood ratio (LLR), for a portion of the receiver signal 114 corresponding to one or more of the symbols transmitted for the serving signal 112. Also for example, the serving content module 316 can calculate LLR for bits or code word corresponding to the serving signal 112 or the serving content 108 intended for communication. Also for example, the serving content module 316 can use the interference signal 118, the interference content 120, or a combination thereof to cancel or whiten from the receiver signal 114 in processing for the serving signal 112, the serving content 108, or a combination thereof.

The serving content module 316 can use iterative configurations, such as for iterative detection-decoding configuration or successive cancelling configuration. The serving content module 316 can further iteratively process the information with the interference processing module 314.

The control flow can pass between the interference processing module 314 and the serving content module 316, such as for using the processing result of one module to update or reprocess the results of the other module. The serving content module 316 and the interference processing module 314 can calculate and pass soft information for iteratively refining the quality of the receiver signal 114 for recovering the serving content 108.

The serving content module 316 can use the first communication unit 216, the second communication unit 236, the first control unit 212, the second control unit 234, or a combination thereof to process for the serving content 108. The serving content module 316 can store the processing results, such as the serving signal 112, the serving content 108, or a combination thereof in the first communication unit 216, the second communication unit 236, the first storage unit 214, the second storage unit 246, or a combination thereof.

After processing the serving content 108, the control flow can be passed from the serving content module 316 to the feedback module 318. The control flow can pass similarly as described above between the mechanism generator module 302 and the mechanism distribution module 304 but using processing results of the serving content module 316, such as the serving signal 112, the serving content 108, or a combination thereof.

The feedback module 318 is configured to communicate with the transmitting device. The feedback module 318 can generate and transmit the receiver feedback 158 of FIG. 1 to the serving transmitting device. The feedback module 318 can generate and transmit the receiver feedback 158 using the first device 102 to the second device 106.

The feedback module 318 can generate the receiver feedback 158 including the negative acknowledgement 162 of FIG. 1, the channel feedback information 160 of FIG. 1, or a combination thereof. The feedback module 318 can generate and transmit the negative acknowledgement 162 based on failure to process for the serving content 108, such as based on a failed checksum result or reaching an iteration limit. The feedback module 318 can generate and transmit the negative acknowledgement 162 for requesting retransmission of the data or to report a processing error.

The feedback module 318 can generate the channel feedback information 160 using the interference-based feedback mechanism 154. The feedback module 318 can further generate the channel feedback information 160 based on the interference communication scheme 124, the serving communication scheme 110, the serving link metric 142, the interference link metric 144, or a combination thereof. The feedback module 318 can further generate the channel feedback information 160 for the target rate 152 of FIG. 1.

For example, the feedback module 318 can determine a desired instance of the target rate 152. The feedback module 318 can use the interference communication scheme 124, the serving link metric 142, the interference link metric 144, or a combination thereof corresponding for the target rate 152 for the interference-based feedback mechanism 154. The feedback module 318 can generate the channel feedback information 160 based on the serving communication scheme 110 resulting from inputting the information for the interference-based feedback mechanism 154.

Also for example, the feedback module 318 can generate the channel feedback information 160 using the interference-based feedback mechanism 154 including the mechanism complexity order 156 of FIG. 1 of four or less. The feedback module 318 can generate the channel feedback information 160 using the interference-based feedback mechanism 154 describing or representing a relationship between the serving communication scheme 110, the interference communication scheme 124, the serving link metric 142, the interference link metric 144, or a combination thereof corresponding for the target rate 152. The parameters included in the relationship can be four parameters or less for the interference-based feedback mechanism 154.

As a more specific example, the feedback module 318 can generate the channel feedback information 160 using the interference-based feedback mechanism 154 according to:

$$BLER_d = f(MIB_d, MIB_i, MCS_d, MCS_i).$$ Equation (12).

$$BLER_d = f(m_d, m_i, MCS_d, MCS_i).$$ Equation (13).

The target rate 152 can be represented as '$BLER_d$'. The interference-based feedback mechanism 154 or the LUT associated thereto can be represented as '$f(\ )$'.

The interference link metric 144 can be represented as '$MIB_i$' or '$m_i$', the serving link metric 142 can be represented as '$MIB_d$' or '$m_d$', and the interference communication scheme 124 can be represented as '$MCS_i$'. The serving communication scheme 110 can be represented as '$MCS_d$'. The feedback module 318 can further use the target rate 152, the interference link metric 144, the serving link metric 142, the interference communication scheme 124, the serving communication scheme 110, or a combination thereof can be utilized as an input parameter or an output parameter.

It has been discovered that the channel feedback information 160 directly based on the interference communication scheme 124 provides increased intelligence and efficiency in decoding for the serving content 108. The interference-aware receiver 132 enables recognition or determination of the interference signal 118 or the interference content 120 using the interference communication scheme 124. The interference information influencing the communication environment can be used to directly identify the channel feedback information 160 corresponding to the serving communication scheme 110 for achieving the target rate 152.

It has further been discovered that the channel feedback information 160 based on the interference-based feedback mechanism 154 provides increased accuracy for generating the CQI for the channel feedback information 160. The interference-based feedback mechanism 154 representing or describing the relationship between serving communication scheme 110, the interference communication scheme 124, the serving link metric 142, and the interference link metric 144 can accurately capture and characterize the effect of both the MCS and the quality of the link between the first device 102 and the interference source 122 on CQI generation.

It has further been discovered that the serving link metric 142 and the interference link metric 144 based on the linear combination mechanism 150 provide manageable complexity and increased accuracy for determining the serving communication scheme 110. The serving link metric 142 and the interference link metric 144 based on the linear combination mechanism 150 can reduce the mechanism complexity order 156 of the interference-based feedback mechanism 154, which can drastically reduce the number of samples for generating and using the interference-based feedback mechanism 154. The reduced number of samples to create the interference-based feedback mechanism 154 can allow accurate construction of the interference-based feedback mechanism 154 based on manageable complexity.

It has further been discovered that the serving link metric 142 and the interference link metric 144 representing the serving-channel free capacity 136, the interference-channel free capacity 138, and the sum-rate capacity 140 provide reduction in the mechanism complexity order 156 of the interference-based feedback mechanism 154. The serving link metric 142 and the interference link metric 144 can replace the serving-channel free capacity 136, the interference-channel free capacity 138, and the sum-rate capacity 140 for representing the communication channel. The reduction in the mechanism complexity order 156 can lead to reduction in processing complexity, reduction in memory requirement, and increase in accuracy.

It has further been discovered that the channel feedback information 160 based on the interference communication scheme 124, the serving link metric 142, and the interference link metric 144 provides increased throughput. The serving communication scheme 110 based on the channel feedback information 160 utilizing channel characterization based on the interference communication scheme 124, the serving link metric 142, and the interference link metric 144 provides most efficient communication scheme while minimizing communication error to increase the throughput close to optimality.

It has further been discovered that the channel feedback information 160 based the interference-based feedback mechanism 154 including the mechanism complexity order 156 of four or less provides reduced memory requirement and physical area requirement. The interference-based feedback mechanism 154 including reduced instance of the mechanism complexity order 156 of four or less can reduce the number of parameters and total possible combinations stored in memory for the interference-based feedback mechanism 154.

The feedback module 318 can use the first communication unit 216, the second communication unit 236, the first control unit 212, the second control unit 234, or a combination thereof to generate the receiver feedback 158. The feedback module 318 can store the receiver feedback 158 in the first communication unit 216, the second communication unit 236, the first storage unit 214, the second storage unit 246, or a combination thereof.

The feedback module 318 can use the first inter-device interface 217, the second inter-device interface 237, the first communication unit 216, the second communication unit 236, or a combination thereof to communicate the receiver feedback 158. The feedback module 318 can transmit the receiver feedback 158 including the channel feedback information 160, the negative acknowledgement 162, or a combination thereof using the first device 102. The feedback module 318 can receive the receiver feedback 158 using the second device 106.

The transmission module 306 can receive the channel feedback information 160. The transmission module 306 can set or adjust the serving communication scheme 110 according to the channel feedback information 160 for subsequent instance of the serving signal 112. The transmission module 306 can set or adjust the serving communication scheme 110 for achieving the target rate 152 in light of the channel conditions and the interference as indicated by the channel feedback information 160 based on the interference-based feedback mechanism 154, the interference communication scheme 124, the serving link metric 142, the interference link metric 144, or a combination thereof.

Referring now to FIG. 4, therein is shown a detailed control flow of the mechanism generator module 302. The mechanism generator module 302 can generate the interference-based feedback mechanism 154 of FIG. 1. The mechanism generator module 302 can generate the interference-based feedback mechanism 154 for communicating the serving content 108 of FIG. 1, the interference content 120 of FIG. 1, or a combination thereof with devices of computing system 100.

The mechanism generator module 302 can generate the interference-based feedback mechanism 154 for communicating with the first device 102 of FIG. 1, the second device 106 of FIG. 1, the interference source 122 of FIG. 1, or a combination thereof. The mechanism generator module 302 can include a collection module 402, a binning module 404, a counting module 406, a mapping module 408, or a combination thereof.

The collection module 402 is configured to collect analysis samples for generating the interference-based feedback mechanism 154. The collection module 402 can collect the analysis samples by observing a test signal set 412.

The test signal set 412 can include data samples corresponding to various communication scenarios, conditions, or environments. The test signal set 412 can include test input, test output, or a combination thereof for various instances of the channel information.

The collection module 402 can observe the test signal set 412 to include the channel information, such as various instances of the serving channel estimate 128 of FIG. 1, the interference channel estimate 130 of FIG. 1, the serving link metric 142 of FIG. 1, the interference link metric 144 of FIG. 1, the serving-channel free capacity 136 of FIG. 1, the interference-channel free capacity 138 of FIG. 1, the sum-rate capacity 140 of FIG. 1, or a combination thereof. The collection module 402 can further calculate the channel information, such as the link metric or the capacity as described above.

The collection module 402 can utilize the test signal set 412 collected for the computing system 100. For example, the collection module 402 can utilize the test signal set 412 including the serving signal 112 of FIG. 1, the interference signal 118 of FIG. 1, the receiver signal 114 of FIG. 1 corresponding thereto, or a combination thereof intended only for testing and gathering the analysis samples to collect instances of the channel information.

The collection module 402 can further utilize the serving signal 112 intended for communicating the serving content 108 or the processing result associated therewith to observe the test signal set 412. The collection module 402 can observe the test signal set 412 corresponding to the serving content 108 based on processing the receiver signal 114.

The collection module 402 can use the first communication unit 216 of FIG. 2, the second communication unit 236 of FIG. 2, the first control unit 212 of FIG. 2, the second control unit 234 of FIG. 2, the communication unit or the control unit corresponding to the coordinating device or a testing device, or a combination thereof to observe the test signal set 412. The collection module 402 can store the test signal set 412 in the first storage unit 214 of FIG. 2, the second storage unit 246 of FIG. 2, the first communication unit 216, the second communication unit 236, the storage unit or the communication unit of the coordinating device or the testing device, or a combination thereof.

After collecting the analysis samples, the control flow can be passed from the collection module 402 to the binning module 404. The control flow can pass similarly as described above between the mechanism generator module 302 and the mechanism distribution module 304 of FIG. 3 but using processing results of the collection module 402, such as the test signal set 412.

The binning module 404 is configured to group the test signal set 412. The binning module 404 can group according to a method or a process predetermined by the computing system 100 of FIG. 1 or a device therein, such as the second device 106 or the coordinating device.

For example, the binning module 404 can group the test signal set 412 according to unique instances of the communication channel or unique instances of the channel information associated therewith. As a more specific example, the binning module 404 can group the test signal set 412 according to similarities, differences, or a pattern for the serving channel estimate 128, the interference channel estimate 130, the serving link metric 142, the interference link metric 144, the serving-channel free capacity 136, the interference-channel free capacity 138, the sum-rate capacity 140, or a combination thereof among the test signal set 412.

As a further specific example, the binning module can group portions within the test signal set 412 for collecting a serving metric set 414 based on the test signal set 412, for collecting an interference metric set 416 based on the test signal set 412. The serving metric set 414 can include a set of data highlighting the serving signal 112 for a specific target rate. The interference metric set 416 can include a set of data highlighting the interference signal 118 for a specific target rate.

The binning module 404 can use the first communication unit 216, the second communication unit 236, the first control unit 212, the second control unit 234, the communication unit or the control unit corresponding to the coordinating device or a testing device, or a combination thereof to group the test signal set 412. The binning module 404 can store the different groupings, such as the serving metric set 414 or the interference metric set 416, in the first storage unit 214, the second storage unit 246, the first communication unit 216, the second communication unit 236, the storage unit or the communication unit of the coordinating device or the testing device, or a combination thereof.

After binning or grouping the test signal set 412, the control flow can be passed from the binning module 404 to the counting module 406. The control flow can pass similarly as described above between the mechanism generator module 302 and the mechanism distribution module 304 but using processing results of the binning module 404, such as the different groupings.

The counting module 406 is configured to analyze the performance of each bin or grouping of the collected analysis samples. The counting module 406 can analyze by analyzing the error for each of the bin or the grouping of the collected analysis samples.

The counting module 406 can analyze by determining a feedback count 418. The counting module 406 can determine the feedback count 418 by counting the negative acknowledgement 162 of FIG. 1 in or associated with each of the bit or the grouping. The counting module 406 can count the negative acknowledgement 162 associated with the collected analysis samples in each of the bin or the grouping of the collected analysis samples.

The counting module 406 can further analyze by determining the block error rate 134 of FIG. 1 in or associated with each of the bin or the grouping based on the feedback count 418. The counting module 406 can determine the block error rate 134 associated with the collected analysis samples in each of the bin or the grouping of the test signal set 412, such as the serving metric set 414, the interference metric set 416, or a combination thereof.

The counting module 406 can use the first communication unit 216, the second communication unit 236, the first control unit 212, the second control unit 234, the communication unit or the control unit corresponding to the coordinating device or a testing device, or a combination thereof to determining the block error rate 134. The counting module 406 can store the block error rate 134 of each bin or grouping in the first storage unit 214, the second storage unit 246, the first communication unit 216, the second communication unit 236, the storage unit or the communication unit of the coordinating device or the testing device, or a combination thereof.

After analyzing the performance of each bin or grouping, the control flow can be passed from the counting module 406 to the mapping module 408. The control flow can pass similarly as described above between the mechanism generator module 302 and the mechanism distribution module 304 but using processing results of the counting module 406, such as the analysis results.

The mapping module 408 is configured to determine relationships between the collected analysis samples, the analysis results, or a combination thereof. The mapping module 408 can further organize or represent the various relationships to generate the interference-based feedback mechanism 154.

The mapping module 408 can generate the interference-based feedback mechanism 154 offline, such as before receiving the receiver signal 114, or dynamically, such as directly in response to receiving the receiver signal 114. The mapping module 408 can generate the interference-based feedback mechanism 154 based on the feedback count 418, the serving metric set 414, the feedback count 418, or a combination thereof for controlling the channel feedback information 160 of FIG. 1.

For example, the mapping module 408 can map the serving communication scheme 110 of FIG. 1, the interference communication scheme 124 of FIG. 1, the serving link metric 142, the interference link metric 144, or a combination thereof to corresponding instance of the block error rate 134, the feedback count 418, the bin or the grouping, or a combination thereof. Also for example, the mapping module 408 can generate the interference-based feedback mechanism 154 according to Equation (12) or Equation (13).

As a more specific example, the mapping module 408 can generate the interference-based feedback mechanism 154 as LUT mapping relationships between various values or instances of the block error rate 134, the serving communication scheme 110, the interference communication scheme 124, the serving link metric 142, the interference link metric 144, or a combination thereof for the serving metric set 414, the interference metric set 416, or a combination thereof. Also as a more specific example, the mapping module 408 can generate the interference-based feedback mechanism 154 including the mechanism complexity order 156 of FIG. 1 corresponding to a value of four or less.

The mapping module 408 can use the first communication unit 216, the second communication unit 236, the first control unit 212, the second control unit 234, the communication unit or the control unit corresponding to the coordinating device or a testing device, or a combination thereof to generate the interference-based feedback mechanism 154. The mapping module 408 can the interference-based feedback mechanism 154 in the first storage unit 214, the second storage unit 246, the first communication unit 216, the second communication unit 236, the storage unit or the communication unit of the coordinating device or the testing device, or a combination thereof.

Figure 5:
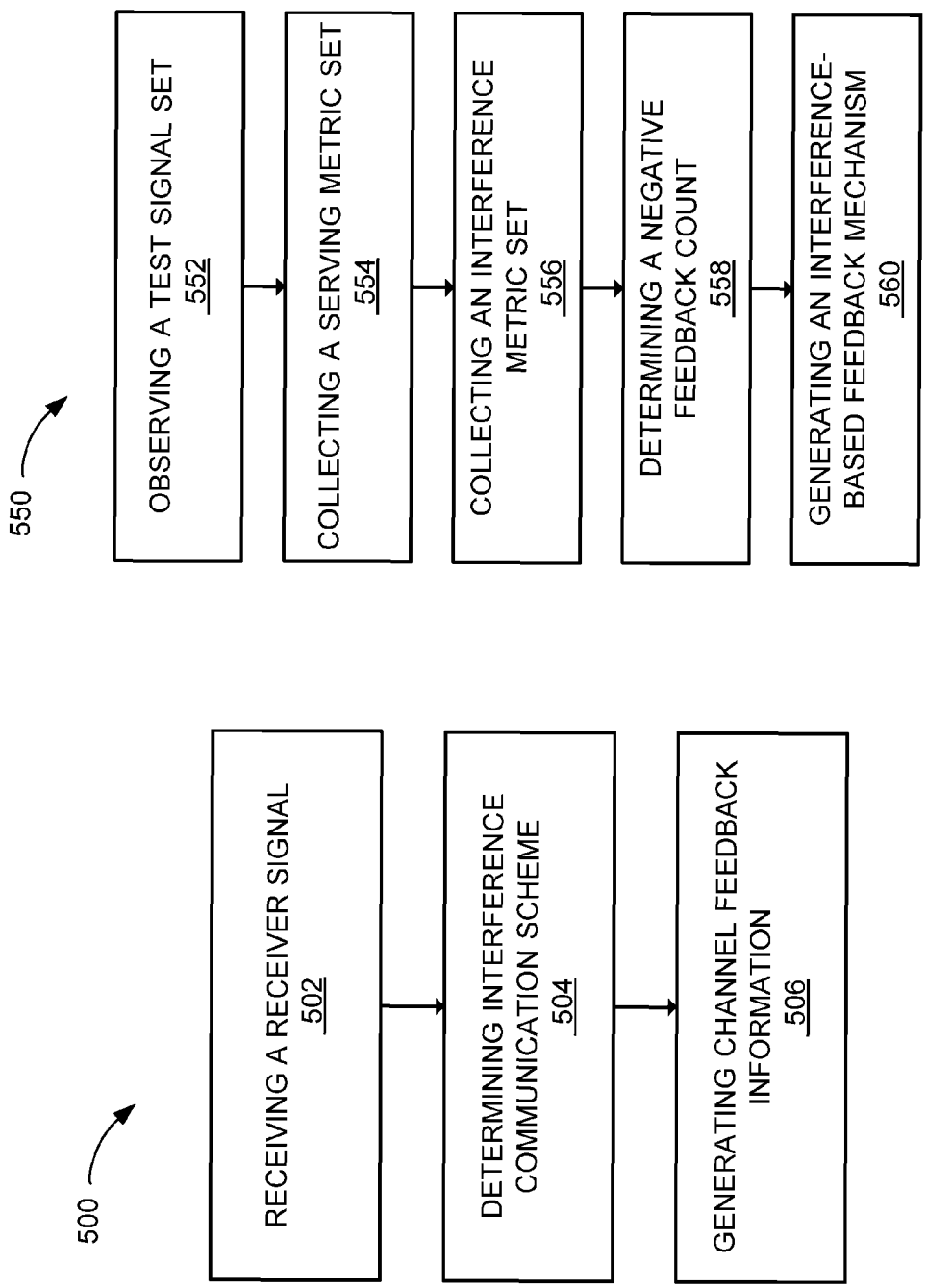
FIG. 5 is a flow chart of a method of operation of a computing system in a further embodiment.

Referring now to FIG. 5, therein is shown a flow chart 500 of a method of operation of a computing system in a further embodiment. The method 500 includes: receiving receiver signal for communicating serving content contemporaneously with interference signal in a block 502; determining interference communication scheme for representing the interference signal included in the receiver signal in a block 504; and generating channel feedback information with a communication unit based on the interference communication scheme in a block 506.

Further referring to FIG. 5, therein is shown a further flow chart 550 of a method of operation of a computing system in a further embodiment. The further method 550 includes: observing a test signal set in a block 552; collecting a serving metric set based on the test signal set in a block 554; collecting an interference metric set based on the test signal set in a block 556; determining a feedback count corresponding to the serving metric set, the interference metric set, or a combination thereof in a block 558; generating an interference-based feedback mechanism with a control unit based on the feedback count, the serving metric set, the feedback count, or a combination thereof for controlling a channel feedback information in a block 560.

The modules described in this application can be hardware implementation or hardware accelerators, including passive circuitry, active circuitry, or both, in the first communication unit 216 of FIG. 2, the second communication unit 236 of FIG. 2, the communication unit of the coordinating device or the testing device, the first control unit 212 of FIG. 2, the second control unit 234 of FIG. 2, the control unit of the coordinating device or the testing device, or a combination thereof. The modules can also be hardware implementation or hardware accelerators, including passive circuitry, active circuitry, or both, within the first device 102 of FIG. 1, the second device 106 of FIG. 1, the coordinating device, the testing device, or a combination thereof but outside of the first communication unit 216, the second communication unit 236, the communication unit of the coordinating device or the testing device, the first control unit 212, the second control unit 234, the control unit of the coordinating device or the testing device, or a combination thereof.

The computing system 100 of FIG. 1 has been described with module functions or order as an example. The computing system 100 can partition the modules differently or order the modules differently. For example, the mechanism generator module 302 of FIG. 3 and the mechanism distribution module 304 of FIG. 3 can be combined. Also for example, the channel estimation process and the link analysis process can be separated into two or more modules for the channel analysis module 312 of FIG. 3.

For illustrative purposes, the various modules have been described as being specific to the first device 102, the second device 106, the coordinating device, the testing device, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the communication unit of the coordinating device or the testing device, the first control unit 212, the second control unit 234, the control unit of the coordinating device or the testing device, or a combination thereof can represent the non-transitory computer readable medium. The first communication unit 216, the second communication unit 236, the communication unit of the coordinating device or the testing device, the first control unit 212, the second control unit 234, the control unit of the coordinating device or the testing device, or a combination thereof, or a portion therein can be removable from the first device 102, the second device 106, the coordinating device, the testing device, or a combination thereof. Examples of the non-transitory computer readable medium can be a non-volatile memory card or stick, an external hard disk drive, a tape cassette, or an optical disk.

The physical transformation of the receiver signal 114 of FIG. 1 according to the serving communication scheme 110 of FIG. 1 corresponding to the interference-based feedback mechanism 154 results in the movement in the physical world, such as content displayed or recreated for the user on the first device 102 from processing the serving content therein. The content reproduced on the first device 102, such as navigation information or voice signal of a caller, can influence the user's movement, such as following the navigation information or replying back to the caller. Movement in the physical world results in changes to the communication channel, the geographic location of the first device 102, the interference signal 118 of FIG. 1, or a combination thereof, which can be fed back into the computing system 100 and influence the channel feedback information 160 of FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another aspect of an embodiment described herein is that it valuably supports and services the historical trend of reducing costs, simplifying systems, and increasing performance.

These and other valuable aspects of an embodiment consequently further the state of the technology to at least the next level.

While the embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   an inter-device interface configured to receive receiver signal for communicating serving content contemporaneously with interference signal;
   a communication unit, coupled to the inter-device interface, configured to:
   calculate an interference link metric and a serving link metric based on a serving-channel free capacity, an interference-channel free capacity, a sum-rate capacity, or a combination thereof for representing a serving channel, an interference channel, or a combination thereof,
   determine interference communication scheme for an interference-aware receiver based on the interference link metric or the serving link metric, wherein:
   the interference link metric is calculated for representing the interference channel,
   the serving link metric is calculated based on a linear combination mechanism for representing the serving channel,
   the interference communication scheme is for representing the interference signal included in the receiver signal, and
   generate channel feedback information based on the interference communication scheme for a target rate.

2. The system as claimed in claim 1 wherein the communication unit is configured to:
calculate an interference link metric for representing an interference channel corresponding to the interference signal; and
generate the channel feedback information based on the interference link metric.

3. The system as claimed in claim 1 wherein the communication unit is configured to:
calculate a serving link metric for representing a serving channel corresponding to communication of the serving content; and
generate the channel feedback information based on the serving link metric.

4. The system as claimed in claim 1 wherein the communication unit is configured to generate the channel feedback information using an interference-based feedback mechanism.

5. The system as claimed in claim 1 wherein the communication unit is configured to determine the interference communication scheme for representing the interference communication scheme received from a transmitting device transmitting the serving content.

6. The system as claimed in claim 1 wherein the communication unit is configured to generate the channel feedback information using an interference-based feedback mechanism including a mechanism complexity order of four or less.

7. The system as claimed in claim 1 wherein the communication unit is configured to determine the interference communication scheme for representing the interference communication scheme determined at a receiving device based on the receiver signal.

8. A method of operation of a computing system comprising:
receiving receiver signal for communicating serving content contemporaneously with interference signal;
calculating an interference link metric and a serving link metric based on a serving-channel free capacity, an interference-channel free capacity, a sum-rate capacity, or a combination thereof for representing a serving channel an interference channel, or a combination thereof;
determining interference communication scheme for an interference-aware receiver based on the interference link metric or the serving link metric, wherein:
the interference link metric is calculated for representing the interference channel,
the serving link metric is calculated based on a linear combination mechanism for representing the serving channel,
the interference communication scheme is for representing the interference signal included in the receiver signal; and
generating channel feedback information with a communication unit based on the interference communication scheme.

9. The method as claimed in claim 8 further comprising:
calculating an interference link metric for representing an interference channel corresponding to the interference signal; and
wherein:
generating the channel feedback information includes generating the channel feedback information based on the interference link metric.

10. The method as claimed in claim 8 further comprising:
calculating a serving link metric for representing an serving channel corresponding to communication of the serving content; and
wherein:
generating the channel feedback information includes generating the channel feedback information based on the serving link metric.

11. The method as claimed in claim 8 wherein the channel feedback information includes generating the channel feedback information using an interference-based feedback mechanism.

12. The method as claimed in claim 8 wherein determining the interference communication scheme includes determining the interference communication scheme for representing the interference communication scheme received from a transmitting device transmitting the serving content.

13. A method of operation of a computing system comprising:
observing a test signal set;
calculating an interference link metric and a serving link metric based on a serving-channel free capacity, an interference-channel free capacity, a sum-rate capacity, or a combination thereof for representing a serving channel, an interference channel, or a combination thereof for the test signal set;
collecting a serving metric set based on the test signal set, wherein the serving metric set is for representing a serving link metric calculated based on a linear combination mechanism for representing the serving channel;
collecting an interference metric set based on the test signal set, wherein the interference metric set is for representing the interference link metric calculated for representing the interference channel;
determining a negative feedback count corresponding to the serving metric set, the interference metric set, or a combination thereof; and
generating an interference-based feedback mechanism with a control unit based on the negative feedback count, the serving metric set, the negative feedback count, or a combination thereof for controlling a channel feedback information.

14. The method as claimed in claim 13 wherein generating the interference-based feedback mechanism includes generating the interference-based feedback mechanism including a mechanism complexity order of four or less.

15. The method as claimed in claim 13 wherein generating the interference-based feedback mechanism includes generating the interference-based feedback mechanism based on mapping a serving communication scheme, an interference communication scheme, the serving link metric, the interference link metric, or a combination thereof to a target rate.

16. The method as claimed in claim 13 wherein:
generating the interference-based feedback mechanism includes generating the interference-based feedback mechanism offline; and
further comprising:
communicating the interference-based feedback mechanism for transmitting the interference-based feedback mechanism to a first device, a second device, or a combination thereof.

17. A non-transitory computer readable medium including instructions for a computing system comprising:
- observing a test signal set;
- calculating an interference link metric and a serving link metric based on a serving-channel free capacity, an interference-channel free capacity, a sum-rate capacity, or a combination thereof for representing a serving channel, an interference channel, or a combination thereof for the test signal set;
- collecting a serving metric set based on the test signal set, wherein the serving metric set is for representing a serving link metric calculated based on a linear combination mechanism for representing the serving channel;
- collecting an interference metric set based on the test signal set, wherein the interference metric set is for representing the interference link metric calculated for representing the interference channel;
- determining a negative feedback count corresponding to the serving metric set, the interference metric set, or a combination thereof; and
- generating an interference-based feedback mechanism based on the negative feedback count, the serving metric set, the negative feedback count, or a combination thereof for controlling a channel feedback information.

* * * * *